United States Patent [19]

Onodera et al.

[11] Patent Number: 5,708,491
[45] Date of Patent: Jan. 13, 1998

[54] TEMPLE TIP FOR A FRAME OF SPECTACLES

[75] Inventors: Masaaki Onodera, Kawasaki; Junji Kanzaki, Tokyo, both of Japan

[73] Assignee: Nikon Corporation, Tokyo, Japan

[21] Appl. No.: 706,960

[22] Filed: Sep. 3, 1996

Related U.S. Application Data

[63] Continuation of Ser. No. 490,889, Jun. 15, 1995, abandoned.

[30] Foreign Application Priority Data

Jun. 20, 1994 [JP] Japan .................. 6-137362

[51] Int. Cl.⁶ ...................................... G02C 5/14
[52] U.S. Cl. .............................. 351/122; 351/123
[58] Field of Search ....................... 351/111, 122, 351/123, 41

[56] References Cited

U.S. PATENT DOCUMENTS

| | | | |
|---|---|---|---|
| 3,768,892 | 10/1973 | Bidgood | 351/158 |
| 3,953,114 | 4/1976 | Bidgood | 351/123 |
| 4,925,291 | 5/1990 | Anger et al. | 351/122 |
| 4,955,706 | 9/1990 | Schmidthaler et al. | 351/41 |
| 5,007,726 | 4/1991 | Suzuki et al. | 351/122 |
| 5,345,616 | 9/1994 | Wiedner | 2/446 |

FOREIGN PATENT DOCUMENTS

| | | |
|---|---|---|
| 0 529 202 | 3/1993 | European Pat. Off. |
| 37 15 259 | 11/1988 | Germany |
| 9110076.3 | 11/1991 | Germany |
| 55-48936 | 11/1981 | Japan |
| 61-54206 | 11/1986 | Japan |

OTHER PUBLICATIONS

Patent Abstracts of Japan, vol. 12, No. 210 (P–717) Jun. 16, 1988 (JP–A–63 008 716).

*Primary Examiner*—Huy Mai
*Attorney, Agent, or Firm*—Shapiro and Shapiro

[57] ABSTRACT

A temple tip for a frame of spectacles has a structure in which a portion not touched by the ear is made of the first resin and a portion touched by the ear is made of the second resin having a smaller hardness than the first resin.

16 Claims, 2 Drawing Sheets

TEMPLE TIP FOR A FRAME OF SPECTACLES

This is a continuation of application Serial No. 08/490,889 filed Jun. 15, 1995, now abandoned.

BACKGROUND OF THE INVENTION

1. Field of the Invention

The present invention relates to a temple tip to be attached to a temple of a frame of a pair of spectacles.

2. Related Background Art

A temple tip (a portion to ride on the ear of the user) of a frame for spectacles is a part which touches the human body directly and requires special consideration for practical use. An ear end called a skull temple type (FIG. 3) is generally preferred by users because it is less troublesome for the users when putting on or taking off their spectacles. However, for spectacles for children or spectacles for sports that can be moved severely, a temple tip generally called a cable which is formed in a substantial semicircular arc (FIG. 4) is used instead of a temple tip of skull temple type so that the frame is prevented from slipping off of the ear.

In order to prevent pain of the ear when the spectacles are used for a long time because an area of the skin (the ear) touched by the temple tip is large, and in order to absorb the impact following a movement of the user so as to give no stimulus to the skin, the temple tip of the cable is conventionally made of a metallic core (or a hard resin core) with vinyl chloride resin, silicon rubber, or the like coated thereon, or is molded only with TPE (thermo plastic elastomer) without a metallic core and is mounted on the chassis of the spectacle frame.

Further, as an example of a temple tip made of a metallic core (or a hard resin core) with a silicon rubber coated thereon, there is proposed in the Japanese Patent Publication No. 61-54206 a temple tip which is formed by swelling with a lubricant a plastic tube made of a silicon rubber and matching the form of the temple tip, attaching said plastic tube to the coated part, and then evaporating and volatilizing the swelling agent.

However, such a temple tip which is formed with the contracted and coated plastic tube of silicon rubber contracted and has a disadvantage that the coated silicon rubber is thin as a whole and feels hard to the user when wearing the spectacles with said ear end because of its lack of elasticity. The temple tip using a metallic core has other disadvantages. For example, it is inferior in resistance to fatigue from flexing, is easily damaged, and is inferior in corrosion resistance. Also, a temple tip molded only of cellulose propionate or the like is unsatisfactory in stability, and its face hardness is rather hard so as to render an unsatisfactory feeling in wearing. When the surface hardness of the temple tip is softened in order to solve this problem, its durability is deteriorated.

Further, the temple tip in a skull temple form has an advantage that spectacles with said temple chip are easily put on. However, it has a problem that the spectacle frame easily gets loose or slips off because of strenuous movements, etc. On the other hand, the temple tip in a cable or riding bow form has an advantage that spectacles with said temple tip do not easily get loose during strenuous movements and are suitable for sports. However, the spectacles with said temple tip usually require both hands to be taken off by the and are difficult to be put on and taken off, as compared to those with the temple tip in a skull temple form.

Furthermore, there may arise a shift or a dislocation between the metallic core and the silicon rubber or the like formed thereon, and the silicon rubber may be rotated.

SUMMARY OF THE INVENTION

An object of the present invention is to provide a new temple tip for a frame of spectacles which can solve the problems belonging to a conventional temple tip in a skull temple form or in a cable, and render a satisfactory feeling in wearing with improved durability. With such a temple tip, the spectacles can be easily put on and taken off like those with a temple tip of skull temple type, and can be securely held like those with the temple tip of the cable type.

The present inventors made intensive study on a shape and a material for the temple tip. As a result, the present inventors gave special importance to the hardness of a material, and found that the problems of the prior art could be solved if the temple tip was made of a material having a smooth wearing feeling and durability and had the structure which could make the most of the advantages of both types of temple tips.

Then, the present invention first provides "a temple tip having a structure of a frame for spectacles in which a portion not touching the ear is made of a first resin and another portion touching the ear is made of a second resin having a lower hardness than said first resin".

The present invention secondly provides "a temple tip having a structure of a frame for spectacles and taking a middle form between a skull temple form and a semicircular arc in which a portion not touching the ear is made of a first resin and another portion touching the ear is made of a second resin having a lower hardness than said first resin".

The present invention thirdly provides a temple tip having a structure of a frame for spectacles and taking a middle form between a skull temple form and a semicircular arc in which a portion not touching the ear is made of a first resin and another portion touching the ear is made of a second resin having a lower hardness than said first resin, and a projection made of said second resin is formed on the tip of said temple tip.

Also, it is preferable that in an ear end having a double structure such as those mentioned above, both of said first resin and said second resin should be made of polyolefin thermal plastic elastomer. Further, it is preferable that in a temple tip having a structure such as those mentioned above, said first resin should be made of polyolefin resin and said second resin should be made of polyolefin thermo plastic elastomer. It is also preferable that in a temple tip having a structure such as those mentioned above, both of said first resin and said second resin should be made of polyester elastomer. It is further preferable that in a temple tip having a structure such as those mentioned above, both said of first resin and said second resin should be made of polyurethane elastomer. In addition, the present invention provides a frame for spectacles to which a temple tip and a frame chassis are attached to each other without bonding means Resins for constituting a temple tip of the present invention are selected by taking into consideration feeling during wearing and durability. According to the present invention, the thickness of a hard resin and that of a soft resin can be selected freely so that the softness and the entire rigidity can be freely controlled. That is, when a hard material is used as the first resin and the dimensions thereof are set to be large, a temple tip having excellent spring performance can be manufactured. Also, when a soft material is used as the second resin and the dimensions thereof are set to be large, a temple tip which is very tender to the human skin and renders satisfactory feeling in wearing can be manufactured.

Combinations of the first resin and the second resin can be considered as follows.

TABLE 1

|   | First resin (hard) | Second resin (soft) |
|---|---|---|
| 1 | Polyolefin elastomer | Polyolefin elastomer |
| Hardness | JIS-A 60-90 | JIS-A 40-65 |
| 2 | Polyolefin resin | Polyolefin elastomer |
| Hardness | Durometer hardness D 50-80 | JIS-A 40-65 |
| 3 | Polyester elastomer | Polyester elastomer |
| Hardness | Shore hardness D 50-80 | Shore hardness D 40-65 |
| 4 | Polyurethane | Polyurethane elastomer |
| Hardness | Durometer hardness D 50-80 | Shore hardness D 40-65 |

DETAILED DESCRIPTION OF THE PREFERRED EMBODIMENTS

Detailed description of the preferred embodiments will be made with reference to the accompanying drawings.

Figure 1:
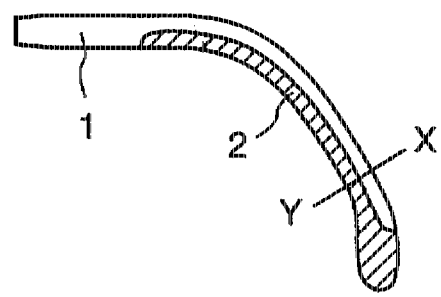
FIG. 1 is a schematic view showing a temple tip for a pair of spectacles used in an embodiment of the present invention.
Figure 2:
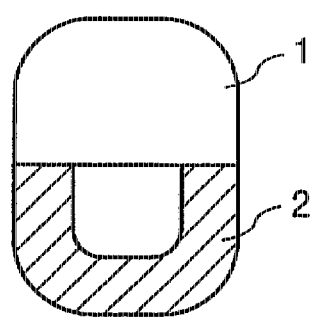
FIG. 2 is a schematic view showing a cross section of the temple tip shown in FIG. 1, along the line X--Y to FIG. 3 is a view showing a conventional temple tip for a pair of spectacles of the skull temple type
Figure 3:
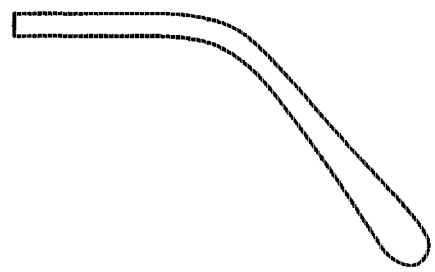
Figure 4:
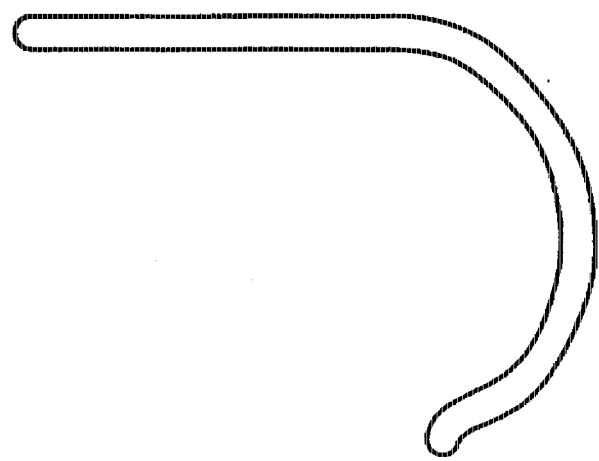
FIG. 4 is a view showing a convnetional temple tip for a pair of spectacles of the cable or riding bow type and FIG. 5 is a cross-sectional view of a modification of the embodiment according to the present invention.

As materials for the temple tip shown in FIG. 1, a polyolefin resin is used for the first resin 1, and a polyolefin elastomer is used for the second resin 2. In order to strengthen a bond between the first resin and the second resin, the cross section to be bonded is made to have a large joining area, as shown in FIG. 2. The materials used have no adverse influence on the human body and have physical properties shown in the below.

First resin

Hardness: 62 [Test method: JIS K7215] [Condition: Durometer hardness D]

Tensile strength at break: 90 kg/cm [Test method: JIS K7113] [Condition: dumbbell No. 2]

Tensile elongation at break: 820% [Test method: JIS K7113] [Condition: dumbbell No. 2]

Tensile strength at yield point: 90 kg/cm [Test method: JIS K7113] [Condition: dumbbell No. 2]

Second resin

Hardness: 45 [Test method: JIS K6301] [Condition: JIS-A]

Tensile strength at break: 85 kg/cm [Test method: JIS K6301] [Condition: dumbbell No. 3]

Tensile elongation at break: 850% [Test method: JIS K6301] [Condition: dumbbell No. 3]

Test strength: 18 kg/cm [Test method: JIS K6301] [Condition: test piece B-type]

Heat resistant temperature: 125° C. [Mitsubishi Yuka method] [Condition: 3 kg/cmX1H, 20% modified]

Two plastics which are made of the first and second resins and made in to temple tips are molded separately by an injection molder. Injection molding is a method in which a solid material called a pellet is heated to a melting point of the material to change it into a liquid resin, and said liquid resin is injected into a metal mold with a desired pressure and then cooled in the metal mold so as to cure the resin. The plastics can also be molded by pouring a liquid resin into a mold which is formed in the shape of each temple tip. This method is generally called casting polymerization. There may be another method of processing a block which is made of plastic into a desired form by machine work such as cutting.

For bonding the two melted plastics, a surface to be joined of at least one plastic is heated to be partly melted, and in a state where the surface to be joined is melted the surface to be joined of the one plastic is joined with a surface to be joined of the other plastic, thereby bonding both plastics being bonded to form one body. Heating in this case is conducted at a temperature at which the plastic is not wholly melted and in such a manner that only the surface to be joined can be heated. It is also possible, for example, to use a fixed heating means in the form of, for example, a plate which has an area capable of contacting, for example, a surface to be joined of the plastic, to bring said heating means into contact with that surface, to heat only the surface to be joined of the plastic, to melt the surface to be joined, and then to join both the plastics in the melted state to bond them. It is also possible to fix the plastics, to use a bar-like heating means, and then to trace a surface to be joined with said bar-like heating means to thereby melt the surface to be joined.

The heating temperature is preferably a temperature a little lower than the melting point of the resin to be heated. The reason therefor is to prevent the plastics from melting entirely.

It is also possible to bond the two resins together by using an adhesive. Any adhesive usually used to bond resins may be used as the adhesive in this method, and may be, for example, an adhesive of epoxy, cyanoacrylate, elastomer, or thermoplastic resin type, but is not limited to these.

Further, it is possible to use a solvent to melt a surface to be joined of at least one molded plastic, and then join two molded plastics in a state where that surface is melted, thereby bonding both the plastics. Any conventional solvent such as acetone, acetate, aniline, cyclohexane, ethyl acetate, phlorobenzene, methyl chloride, methyl ethyl ketone, toluene, xylene, etc., is usable in this method.

Figure 5:
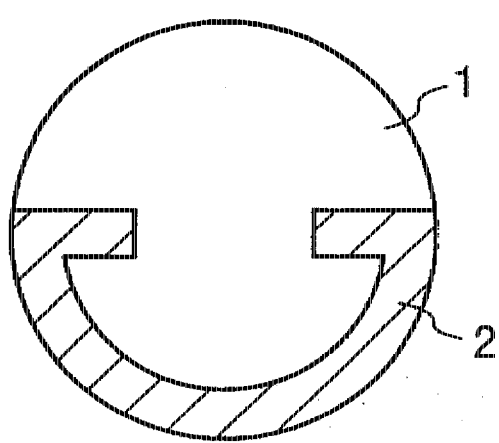

As shown in FIG. 5, the first resin 1 and the second resin 2 may be formed in an interlocking structure in which these resins are engaged with each other to be fixed together.

A temple tip which is formed by bonding the two plastics together in this manner is attached to a temple. It can be attached by using an adhesive. It can also be attached by heating the temple, melting a contact portion of the temple tip with the heating portion, and then cooling the portion to be fixed.

A combination of the first and second resins by using materials shown in Table 1 is a combination when a tilting performance by heating or a solvent is taken into consideration. When the two resins are joined or bonded by heating or with a solvent, joining or bonding of materials of said two resins presents a problem unless the materials to be used have similar structures belonging in the same or similar series. Therefore, when the two resins are bonded together with an adhesive, a combination other than those shown in Table 1 is also permitted. For example, combinations as shown in Table 2 are also permitted.

TABLE 2

|   | First resin (hard) | Second resin (soft) |
|---|---|---|
| A | Polyolefin resin | Polyester elastomer |
| B | Polyester elastomer | Polyurethane |
| C | Polyester elastomer | Polyolefin resin |
| D | Polyurethane | Polyolefin elastomer |

The temple tip is heated to be attached to the temple so that no adhesive is necessary. However, the temple tip can be attached, of course, by using an adhesive.

According to the present invention, since a temple tip can be formed by using any resins for the first and second resins, it is possible to obtain a temple tip which is superior both in feeling during wearing and in durability. Also, it is possible to obtain a frame for spectacles having a temple tip which does not get loose as easily as a conventional temple tip of skull temple type and can be put on more easily than a conventional temple tip of a cable or a riding bow type. Also, when a soft resin is used as the second resin, slip of the temple can be prevented. It is also possible to obtain various kinds of temple tips for different uses of spectacles, since a ratio of the first and second resins can be freely determined. Further, according to the present invention, a shift or dislocation due to an exfoliation does not arise between the temple and the tip, unlike in the prior art.

What is claimed is:

1. A temple tip for attaching to a temple of a spectacles frame, comprising:

a portion made of a first resin and forming part of an outer surface of the temple tip that is disposed so as not to touch an ear of a wearer; and a portion made of a second resin having a smaller hardness than said first resin and forming part of said outer surface that is disposed so as to touch the ear, wherein said portion made of the second resin is bonded to said portion made of the first resin over a substantial portion of the length of the temple tip without a gap therebetween.

2. A temple tip for attaching to a temple of a spectacles frame, taking a middle form between a skull temple form and a semicircular arc and comprising:

a portion made of a first resin and forming part of an outer surface of the temple tip that is disposed so as not to touch an ear of a wearer; and a portion made of a second resin having a smaller hardness than said first resin and forming part of said outer surface that is disposed so as to touch the ear, wherein said portion made of the second resin is bonded to said portion made of the first resin over a substantial portion of the length of the temple tip without a gap therebetween.

3. A temple tip for attaching to a temple of a spectacles frame, taking a middle form between a skull temple form and a semicircular arc and comprising:

a portion made of a first resin and forming part of an outer surface of the temple tip that is disposed so as not to touch an ear of a wearer;

a portion made of a second resin having a smaller hardness than said first resin and forming part of said outer surface that is disposed so as to touch the ear, wherein said portion made of the second resin is bonded to said portion made of the first resin over a substantial portion of the length of the temple tip without a gap therebetween; and a projection made of said second resin and projecting from said portion made of said second resin to form an end of said temple tip.

4. A temple tip according to claim 1, 2 or 3, wherein both of said first and second resins are polyolefin thermo plastic elastomer.

5. A temple tip according to claim 1, 2 or 3, wherein both of said first and second resins are polyolefin thermoplastic elastomer, said first resin has a hardness within a range of 60 to 90 according to JIS-A standards, and said second resin has a hardness within a range of 40 to 65 according to JIS-A standards.

6. A temple tip according to claim 1, 2 or 3, wherein said first resin is polyolefin resin and said second resin is polyolefin thermo plastic elastomer.

7. A temple tip according to claim 1, 2 or 3, wherein said first resin is polyolefin resin, said second resin is polyolefin thermoplastic elastomer, said first resin has a Durometer hardness within a range of 50 to 80, and said second resin has a hardness within a range of 40 to 65 according to JIS-A standards.

8. A temple tip according to claim 1, 2 or 3, wherein both of said first and second resins are polyester elastomer.

9. A temple tip according to claim 1, 2 or 3, wherein both of said first and second resins are polyester elastomer, said first resin has a Shore hardness within a range of 50 to 80, and said second resin has a Shore hardness within a range of 40 to 65.

10. A temple tip according to claim 1, 2 or 3, wherein said first resin is polyurethane and said second resin is polyurethane elastomer.

11. A temple tip according to claim 1, 2 or 3, wherein said first resin is polyurethane, said second resin is polyurethane elastomer, said first resin has a Durometer hardness within a range of 50 to 80 and said second resin has a hardness within a range of 40 to 65 according to JIS-A standards.

12. A frame for a pair of spectacles, comprising:

a pair of right and left rims for holding a pair of right and left lenses, respectively;

a bridge for connecting said right and left rims;

a pair of right and left temples arranged on said right and left rims, respectively, at positions at which said bridge is not mounted; and temple tips, each temple tip being provided on a free end of a corresponding one of said right temple and said left temple and having a portion made of a first resin forming part of an outer surface of the temple tip that is disposed so as not to touch an ear of a wearer and a portion made of a second resin having a smaller hardness than said first resin and forming part of said outer surface that is disposed so as to touch the ear, wherein said portion made of the second resin is bonded to said portion made of the first resin over a substantial portion of the length of the temple tip without a gap therebetween.

13. A temple tip according to claim 1, wherein said portion made of the first resin and said portion made of the second resin are configured such that an outer surface of the temple tip has a substantially smooth contour where said portions come together.

14. A temple tip according to claim 2, wherein said portion made of the first resin and said portion made of the second resin are configured such that an outer surface of the temple tip has a substantially smooth contour where said portions come together.

15. A temple tip according to claim 3, wherein said portion made of the first resin and said portion made of the second resin are configured such that an outer surface of the temple tip has a substantially smooth contour where said portions come together.

16. A frame according to claim 12, wherein, in each temple tip, said portion made of the first resin and said portion made of the second resin are configured such that an outer surface of the temple tip has a substantially smooth contour where said portions come together.

* * * * *